United States Patent Office 2,870,136
Patented Jan. 20, 1959

2,870,136

POLYAZO-DYESTUFFS

Walter Hanhart, Riehen, Switzerland, assignor to Ciba Limited, Basel, Switzerland, a Swiss firm No Drawing. Application April 7, 1955
Serial No. 500,014

Claims priority, application Switzerland April 14, 1954

7 Claims. (Cl. 260—173)

This invention provides new polyazo-dyestuffs which like, for example, the dyestuff of the constitution (1)
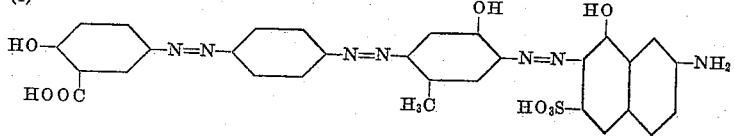

correspond to the general formula (2)
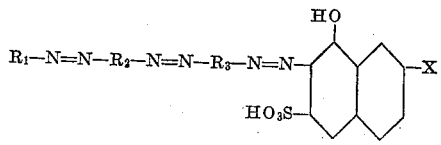

in which $R_1$ represents a benzene radical containing in para-position to the azo linkage a hydroxyl group and in ortho-position to the latter group a carboxylic acid group, $R_2$ represents a benzene radical bound in para-position to the azo linkages, $R_3$ represents a benzene radical bound in para-position to the azo linkages and containing in ortho-position to the azo linkage bound to the naphthalene nucleus a hydroxyl group, and X represents a primary amino group or an acylamino group.

The invention also provides a process for the manufacture of the new dyestuffs of the Formula 2, wherein a complex metal compound of the formula (3)
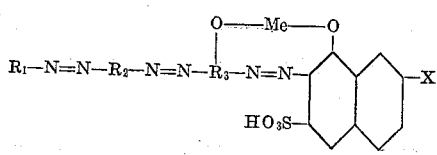

is demetallized. In Formula 3 $R_1$ represents a benzene radical containing in para-position to the azo linkage a hydroxyl group and in ortho-position to the latter group a carboxylic acid group, $R_2$ represents a benzene radical bound in para-position to the azo linkages, $R_3$ represents a benzene radical bound in the 1-, 3- and 4-positions to the groups —$R_2$—N=N—, —O—Me— and —N=N—, X represents a primary amino group or acylamino group and Me represents a metal atom bound in complex union.

The metalliferous dyestuffs of the Formula 3 are obtained by treating a polyazo-dyestuff of the general formula (4)
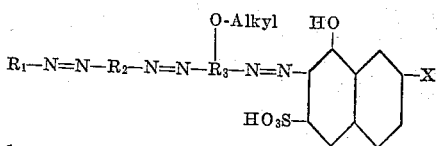

in which:

$R_1$ represents a benzene radical containing in para-position to the azo linkage a hydroxyl group and in ortho-position to the latter group a carboxylic acid group, $R_2$ represents a benzene radical bound in para-position to the azo linkages, $R_3$ represents a benzene radical bound in the 1-, 3- and 4-positions to the groups —$R_2$—N=N—, —O=Alkyl and —N=N—, and X represents a primary amino group or an acylamino group with an agent yielding metal, for example, an agent yielding cobalt, nickel or advantageously copper, under conditions such that an ortho:ortho'-dihydroxy-azo-metal complex is formed with the splitting up of the alkoxy group.

The polyazo-dyestuffs of the Formula 4 are advantageously prepared by coupling a diazo compound of an amino-monoazo-dyestuff of the formula (5)     $R_1$—N=N—$R_2$—$NH_2$ 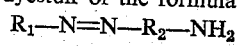

with a primary amine of the formula (6)
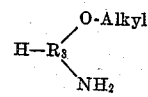

further diazotizing the resulting amino-disazo-dyestuff, and coupling the diazo-disazo-compound with 2-amino-8-hydroxynaphthalene-6-sulfonic acid or a 2-acylamino-8-hydroxy-naphthalene-6-sulfonic acid. The meanings of $R_1$, $R_2$ and $R_3$ will be apparent from the definitions of these symbols given above. In the compound of the Formula 6 the amino group is therefore in para-position to the carbon atom at which coupling occurs, and the alkoxy group is in ortho-position to the amino group.

As examples of amino-monoazo-dyestuffs of the formula 5 there by be mentioned 4-amino-4'-hydroxy-1,1'-azobenzene-3'-carboxylic acid,
4 - amino - 4' - hydroxy-1,1'-azobenzene-3,3'-dicarboxylic acid,
2 - chloro - 4 - amino - 4' - hydroxy - 1,1' - azobenzene-3'-carboxylic acid,
2- or 3-methyl-4-amino-4'-hydroxy-1,1'-azobenzene-3'-carboxylic acid,
2- or 3-methoxy-4-amino-4'-hydroxy-1,1'-azobenzene-3'-carboxylic acid,
2,5 - dimethyl - 4 - amino - 4' - hydroxy - 1,1' - azobenzene-3'-carboxylic acid,
2,5 - dimethoxy - 4 - amino - 4' - hydroxy - 1,1' - azobenzene-3'-carboxylic acid,
2 - methyl - 4 - amino - 5 - methoxy - 4' - hydroxy - 1,1'-azobenzene-3'-carboxylic acid,
4 - amino - 4' - hydroxy - 5' - methyl - 1,1' - azobenzene-3'-carboxylic acid,
4 - amino - 4' - hydroxy - 5' - chloro - 1,1' - azobenzene-3'-carboxylic acid.

From the amino-monoazo-dyestuffs of the Formula 5 and the amines of the Formula 6 there are obtained amino-disazo-dyestuffs of the formula (7) 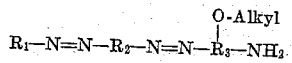

The alkoxy group which is present in ortho-position to the amino group in the amines of the Formula 6 advantageously contains only a few carbon atoms as in the case, for example, of an ethoxy or methoxy group.

As amines of the Formula 6 there come into consideration, for example, the following compounds:

1-amino-2-methoxy- or -2-ethoxybenzene,
1-amino-2-methoxy- or -2-ethoxy-5-methylbenzene,
1-amino-2,5-dimethoxy- or -2,5-diethoxybenzene,
1-amino-2-ethoxy-5-methoxybenzene.

The coupling of the amines of the formula $$H-R_2-NH_2$$

and those of the Formula 6 with the diazo compounds or the diazo-azo-compounds is usually carried out with advantage in a weakly acid medium, for example, an acetic acid medium. If these coupling components have only a weak capacity for coupling, it is of advantage to couple them in the form of their ω-methane sulfonic acids and subsequently to split off the ω-methane-sulfonic acid group.

The diazo-compounds obtainable from the amino-disazo-dyestuffs of the Formula 7 may be coupled with a 2-acylamino-8-hydroxynaphthalene-6-sulfonic acid, for example 2-acetylamino-8-hydroxynaphthalene - 6 - sulfonic acid, or advantageously with 2-amino-8-hydroxynaphthalene-6-sulfonic acid itself.

The diazo-disazo-compounds are coupled with the end components in an alkaline medium.

It is generally of advantage so to select the starting materials that the final dyestuffs contain a single sulfonic acid group, so that it is of advantage to use diazo-disazo compounds free from sulfonic acid groups.

The polyazo-dyestuffs of the Formula 4 so obtained are then treated with an agent yielding metal under conditions such that an ortho:ortho'-dihydroxy-azo-metal complex is produced accompanied by the splitting up of the alkoxy group bound to the radical $R_3$. For this purpose there may be used, for example, an agent yielding cobalt or nickel, but preferably an agent yielding copper. There may be used, for example, salts of divalent nickel such as nickel sulfate, salts of monovalent or divalent copper such as cuprous chloride or cupric sulfate, and also compounds which contain these metals in complex union. Especially suitable for this purpose are cuprammine complexes, for example, the complex nickel or copper compounds obtainable from ammonia or alkylamine such as ethylamine, or ethanolamine, morpholine, pyridine, a picoline or piperidine. In order that the alkyl group shall be split off completely from the alkoxy group with the formation of the metal complex of the trisazo-dyestuff, it is usually necessary to carry out the treatment with the agent yielding metal at a raised temperature, for example, at about 90° C. and for several hours. It is of advantage to work in an aqueous medium. If desired, the treatment with the agent yielding metal may be carried out in the presence of a suitable addition. As such additions there may be mentioned, bases such as ammonia or pyridine, for example an excess of the base which is present in the molecule of the metal-ammine complex, if the latter is used for the metallization.

The demetallization of the complex metal compounds may be carried out in a manner in itself known, advantageously by the treatment with a concentrated mineral acid, especially hydrochloric acid at the ordinary temperature, or with a dilute mineral acid at a raised temperature, or by treatment with an alkali cyanide or alkali sulfide. When a mineral acid is used for the treatment the metal bound in complex union is converted into an easily soluble metal salt, which can easily be separated from the dyestuff sparingly soluble in an aqueous acid medium. It is generally of advantage to convert the dyestuff so obtained into a soluble alkali salt thereof by treatment with an alkali, for example, sodium carbonate.

The polyazo-dyestuffs of the Formula 2 are suitable for dyeing a very wide variety of materials, for example, animal fibers such as wool, silk and leather, but especially for dyeing or printing cellulose-containing materials, such as cotton, linen and artificial silk or staple fibers of regenerated cellulose. It is of advantage to treat the dyestuffs on the fiber or partially on the fiber and partially in the dyebath with an agent yielding metal by the generally known methods. There may be used with advantage, for example, the process of U. S. Patent No. 2,148,659, in which there are carried out in the same bath first dyeing and then the treatment with the agent yielding metal. As agents yielding metal there are preferably used those which are stable towards alkaline solutions, such as complex copper tartrates.

In some cases especially valuable dyeings can be made by using the process in which a dyeing or print produced with the metal-free dyestuff is after-treated with an aqueous solution which contains a basic formaldehyde condensation product of a compound containing at least once the atomic grouping

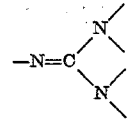

for example, dicyandiamide or dicyandiamidine, or of a compound easily convertible into a compound containing the said atomic grouping, for example, cyanamide, and which solution also contains a water-soluble, preferably complex, copper compound. Such processes are described, for example, in British Patent No. 619,969.

It will be understood that combination dyeings can be produced by using a dyestuff of the invention together with another direct-dyeing dyestuff, for example, a dyestuff of the Formula 4 given above.

The following examples illustrate the invention, the parts and percentages being by weight unless otherwise stated and the relationship of parts by weight to parts by volume being the same as that of the kilogram to the liter:

*Example 1*

6.7 parts of the trisazo-dyestuff of the formula

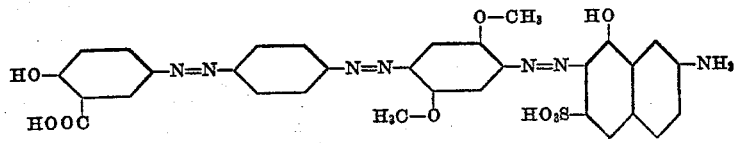

are dissolved in the form of the sodium salt in 300 parts of hot water with the addition of 5.5 parts of an ammonia solution of 24 percent strength. At 95° C. there is added an ammoniacal solution of copper oxide consisting of 2.5 parts of crystalline copper sulfate, 10 parts of water and 4 parts of ammonia solution of 24 percent strength, and the whole is stirred at that temperature for about 24 hours. The precipitated copper compound of the ortho:ortho'-dihydroxy-azo-dyestuff is filtered off, and rendered metal-free by stirring it with cold concentrated hydrochloric acid. After filtering off the dyestuff and washing it with water, it is converted into its sodium salt. When dry it is a black powder which dissolves in concentrated sulfuric acid with a blue coloration and in water with a black-green coloration, and dyes cotton by the single bath or 2-bath after-coppering process greenish black tints which are fast to washing and light.

Example 2

6.6 parts of the trisazo-dyestuff of the formula

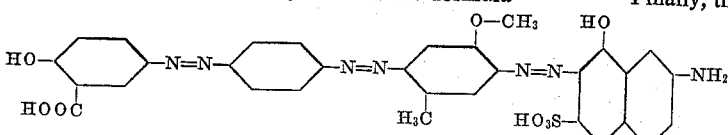

are dissolved at 95° C. in the form of the sodium salt in 300 parts of water and 5.5 parts of ammonia solution of 24 percent strength. An ammoniacal solution of copper oxide, consisting of 2.5 parts of crystalline copper sulfate, 10 parts of water and 4 parts of ammonia solution of 24 percent strength, is added, and the whole is stirred for 18-24 hours at 95° C. The completely precipitated copper compound of the ortho-ortho'-dihydroxy-azo-dyestuff is filtered off, dried and demetallized by stirring it with cold concentrated hydrochloric acid. The dyestuff is filtered off and washed, and converted into its sodium salt by stirring it with sodium carbonate in sodium chloride solution of 10 percent strength. When dry, the sodium salt is a dark powder which dissolves in concentrated sulfuric acid with a blue coloration and in water with a blackish green coloration, and yields on cotton black dyeings which are fast to washing and light after treatment with a copper salt.

It is not essential to dry the dyestuff before demetallization, and it may be used in the form of a paste. The demetallization may be carried out equally well with hot dilute hydrochloric acid, for example, by heating the metalliferous dyestuff for several hours in hydrochloric acid of about 5 percent strength.

If sodium cyanide is used as the decoppering agent, the copper compound of the dyestuff need not be separated from the reaction mixture. Thus, there is added to the warm dyestuff suspension a solution of 2 parts of sodium cyanide, the mixture is stirred for a short time at 60-65° C., and the dyestuff, which is completely dissolved, is precipitated by the addition of 10 parts of sodium chloride per 100 parts by volume of solution.

Further ortho:ortho'-dihydroxy-azo-dyestuffs, which can be prepared in the manner described above by coppering accompanied by demethylation and subsequent demetallization, are given in the following table. The initial dyestuffs are obtained by coupling the diazo compounds of the amino-monoazo-dyestuffs given in column I with the middle components given in column II, and further diazotizing the amino-disazo-dyestuffs and coupling the diazo-disazo-compounds in an alkaline medium with the end components given in column III.

| | I. Amino-monoazo dyestuff | II. Middle component | III. End component | IV. Tint of the coppered dyeing on cotton |
|---|---|---|---|---|
| 1 | 4-amino-4'-hydroxy-1,1'-azobenzene-3'-carboxylic acid. | 1-amino-2-methoxy benzene. | 2-amino-8-hydroxy-naphthalene-6-sulfonic acid. | Black. |
| 2 | 2-methyl-4-amino-4'-hydroxy-1,1'-azo-benzene-3'-carboxylic acid. | 1-amino-2,5-dimethoxybenzene. | ___do___ | Greenish black. |
| 3 | 2,5-dimethyl-4-amino-4'-hydroxy-1,1'-azobenzene-3'-carboxylic acid. | ___do___ | ___do___ | Do. |
| 4 | 2-methoxy-4-amino-4'-hydroxy-1,1'-azobenzene-3'-carboxylic acid. | ___do___ | ___do___ | Black. |
| 5 | 4-amino-4'-hydroxy-5'-chloro-1,1'-azobenzene-3'-carboxylic acid. | ___do___ | ___do___ | Do. |
| 6 | 4-amino-4'-hydroxy-1,1'-azobenzene-3'-carboxylic acid. | ___do___ | 2-acetylamino-8-hydroxynaphthalene-6-sulfonic acid. | Green black. |

Example 3

100 parts of cotton are entered at 50° C. into a dyebath which contains in 4000 parts of water, 4 parts of the trisazo-dyestuff obtained as described in Example 1, and 2 parts of anhydrous sodium carbonate. The temperature is raised to 90-95° C. in the course of 20 minutes, 40 parts of crystalline sodium sulfate are added, and dyeing is continued for ¾ hour to one hour at 90-95° C. The dyeing is then rinsed in cold water and treated for 20-30 minutes at 60-70° C. in a bath which contains in 4000 parts of water 3 parts of acetic acid of 40 percent strength and 3 parts of crystalline copper sulfate. Finally, the dyeing is rinsed in the cold and dried. There is obtained a black dyeing of good fastness to light and washing.

What is claimed is:

1. A polyazo-dyestuff of the formula

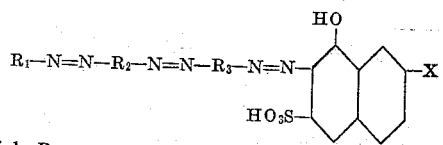

in which $R_1$ represents a benzene radical containing in para-position to the azo linkage a hydroxyl group and in ortho-position to the latter group a carboxylic acid group, $R_2$ represents a benzene radical bound in para-position to the azo linkages, $R_3$ represents a benzene radical bound in para-position to the azo linkages and containing in ortho-position to the azo-linkage bound to the naphthalene nucleous a hydroxyl group, and X represents a member selected from the groups consisting of a primary amino group and an acetylamino group.

2. A polyazo-dyestuff of the formula

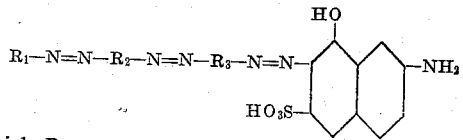

in which $R_1$ represents a benzene radical containing in para-position to the azo linkage a hydroxyl group and in ortho-position to the latter group a carboxylic acid group, $R_2$ represents a benzene radical bound in para-position to the azo linkages and $R_3$ represents a benzene radical bound in para-position to the azo linkages and containing in ortho-position to the azo linkage bound to the naphthalene nucleus a hydroxyl group.

3. A polyazo-dyestuff of the formula

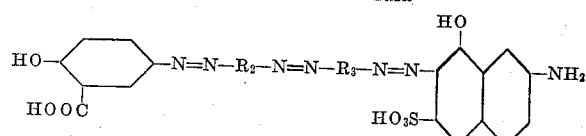

in which $R_2$ represents a benzene radical bound in para-position to the azo linkages and $R_3$ represents a benzene radical bound in para-position to the azo linkages and containing in ortho-position to the azo linkage bound to the naphthalene nucleus a hydroxyl group.

4. A polyazo-dyestuff of the formula

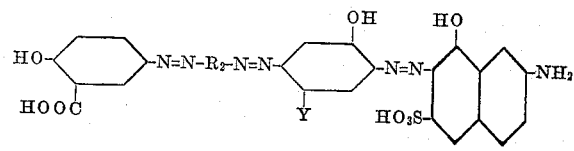

in which $R_2$ represents a benzene radical bound in para-position to the azo linkages and Y represents a member selected from the group consisting of a methyl group and a methoxy group.

5. The polyazo-dyestuff of the formula

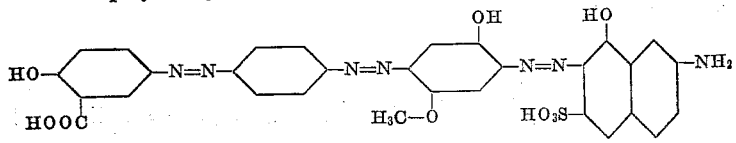

6. The polyazo-dyestuff of the formula

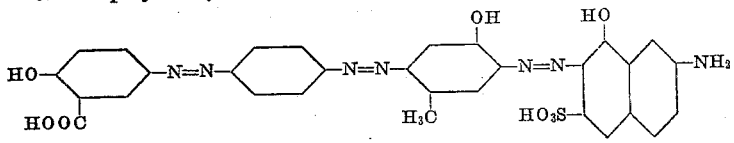

7. The polyazo-dyestuff of the formula

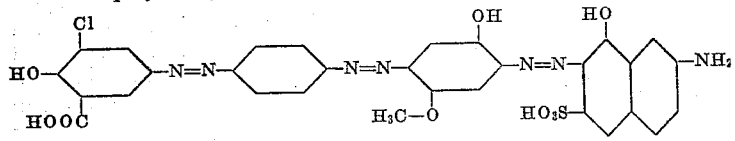

References Cited in the file of this patent

UNITED STATES PATENTS

| | | |
|---|---|---|
| 536,878 | Kirchhoff | Apr. 2, 1895 |
| 2,242,456 | Delfs et al. | May 20, 1951 |

FOREIGN PATENTS

| | | |
|---|---|---|
| 263,533 | Switzerland | Feb. 1, 1950 |

UNITED STATES PATENT OFFICE

CERTIFICATE OF CORRECTION

Patent No. 2,870,136  January 20, 1959

Walter Hanhart

It is hereby certified that error appears in the printed specification of the above numbered patent requiring correction and that the said Letters Patent should read as corrected below.

Column 2, line 4, for the right-hand portion of the formula reading "—O=Alkyl" read -- —O-Alkyl --; columns 5 and 6, Example 2, in the table under the heading "I. Amino-monoazo dyestuff", first item, for "-azobensene-" read -- -azobenzene- --.

Signed and sealed this 4th day of August 1959.

(SEAL)
Attest:

KARL H. AXLINE

Attesting Officer

ROBERT C. WATSON
Commissioner of Patents